ent Number: 4,617,345

United States Patent [19]
Sederel

[11] Patent Number: 4,617,345
[45] Date of Patent: Oct. 14, 1986

[54] POLYMER MIXTURE WHICH COMPRISES AN AROMATIC POLYCARBONATE RESIN AND AN IMPACT STRENGTH-IMPROVING AGENT

[75] Inventor: Willem L. Sederel, TD Roosendaal, Netherlands

[73] Assignee: General Electric Company, Mt. Vernon, Ind.

[21] Appl. No.: 760,886

[22] Filed: Jul. 31, 1985

[30] Foreign Application Priority Data

Aug. 20, 1984 [NL] Netherlands .................... 8402555

[51] Int. Cl.$^4$ ............................................. C08L 69/00
[52] U.S. Cl. ........................................ 525/67; 525/69; 525/71; 525/146; 525/901; 525/902

[58] Field of Search ................... 525/67, 92, 901, 902, 525/71, 69

[56] References Cited

U.S. PATENT DOCUMENTS 4,515,921  5/1985  Witman .................................. 525/67
4,537,930  8/1985  Bussink et al. ....................... 524/505

*Primary Examiner*—Theodore E. Pertilla
*Attorney, Agent, or Firm*—Martin B. Barancik

[57] ABSTRACT

The invention relates to polymer mixtures which comprise an aromatic polycarbonate resin, a block copolymer, and a graft copolymer. The polymer mixtures according to the invention have a good impact strength, in particular at low temperatures, and do not show any delamination phenomena when injection molded.

4 Claims, No Drawings

POLYMER MIXTURE WHICH COMPRISES AN AROMATIC POLYCARBONATE RESIN AND AN IMPACT STRENGTH-IMPROVING AGENT

The invention relates to a polymer mixture which comprises an aromatic polycarbonate resin and an impact strength-improving agent.

Polymer mixtures which comprise an aromatic polycarbonate resin and a selectively hydrogenated block copolymer are known from British Patent Specification No. 2,004,284. The selectively hydrogenated block copolymer improves the flow properties of the melt, the impact strength and the resistance to influences from the atmosphere.

It has been found that, by using two impact strength-improving agents, a polymer mixture is obtained having a better impact strength at low temperature, a better resistance to organic solvents and less delamination as compared with the polymer mixtures according to the British Patent Specification No. 2,004,284.

The polymer mixture according to the invention comprises the following constituents:

(a) 86–99% by weight of an aromatic polycarbonate resin;
(b) 0.5–4% by weight of one or more partially hydrogenated block copolymers consisting of at least two terminal polymer blocks A of a monoalkenyl-arylene having an average molecular weight of 5,000–125,000 and at least one intermediate polymer block B of a conjugated diene having an average molecular weight of 10,000–300,000, the terminal polymer blocks A forming 8–55% by weight of the block copolymer, while not more than 25% by weight of the aromatic double bonds of the polymer blocks A and at least 80% of the aliphatic double bonds of the polymer blocks B have been reduced by hydrogenation, and
(c) 0.5–10% by weight of one or more graft copolymers having an elastomeric core built up for more than 50% by weight from a polymerized diene, optionally a second phase built up from a polymerized vinyl monomer grafted on the core and having an enveloping phase (shell) built up from the polymerized product of one or more monomers selected from the group consisting of a $C_1$–$C_6$ alkyl acrylate, a $C_1$–$C_6$ alkyl methacrylate, acrylic acid, methacrylic acid and a mixture of one or more of the said monomers optionally with a crosslinking agent, which enveloping phase is grafted on the core and on the second phase optionally present, the quantities of a, b and c being calculated with respect to the overall quantity of a+b+c.

The polymer mixture according to the invention preferably comprises 90–99% by weight of aromatic polycarbonate resin (a); 0.5–3.5% by weight of the block copolymer (b), and 0.5–6.5% by weight of the graft copolymer (c).

The polymer mixture according to the invention hence comprises at least the three following constituents:

A—an aromatic polycarbonate resin;
B—a block copolymer, and
C—a graft copolymer.

A—The aromatic polycarbonate resin

Suitable aromatic polycarbonate resins are the polymers derived from a bivalent phenol and a carbonate pre-product, for example phosgene, a halogen formate or a carbonate ester. The aromatic polycarbonate resins preferably possess an intrinsic viscosity of approximately 0.35–0.75 (measured in p.dioxane at 30° C. and expressed in decilitres per gram). Suitable bivalent phenols which may be used for the preparation of these aromatic polycarbonate resins are mononucleus and multinuclei aromatic compounds which comprise 2-hydroxyl groups as functional groups which are both directly bonded to a carbon atom of an aromatic nucleus. Examples of suitable bivalent phenols are: 2,2-bis(4-hydroxyphenyl) propane (Bisphenol-A=BPA), resorcinol; bis(4-hydroxy-5-nitrophenyl) methane; 2,2'-dihydroxydiphenyl; 2,6-dihydroxynaphtalene; bis-(4-hydroxy-phenylsulphone); 5'-chloro-2,4'-dihydroxydiphenyl sulphone; 4,4'-dihydroxydiphenyl ether, and 4,4'-dihydroxy-2,5-diethoxydiphenyl ether.

In preparing the aromatic polycarbonate resins it is possible to use two or more different bivalent phenols or a copolymer of a bivalent phenol with a glycol or with a polyester with hydroxy group or acid terminal group. The aromatic polycarbonate resin may also be prepared in the presence of a dibasic acid. Crosslinked polycarbonate resins as described in U.S. Pat. No. 4,001,184 are also suitable. It is also possible to use a mixture of two or more of the above-mentioned polycarbonate resins. The homopolymer derived from bisphenol A is preferably used as a polycarbonate resin.

B—The block copolymer

Suitable block copolymers for the polymer mixtures according to the invention are described in U.S. Pat. No. 4,088,711. These block copolymers are commercially available under type reference Kraton G-6500; Kraton G-6521; Kraton G-1650 and Kraton G-1652 (Shell).

C—The graft copolymer

The graft copolymer as used in the polymer mixture according to the invention comprises a core on the basis of a conjugated diene, optionally—but indeed preferably—a second phase built up from a polymerized vinyl monomer and a third, enveloping (shell) phase built up from one or more of the polymerized monomers, selected from $C_1$–$C_6$ alkyl acrylate, $C_1$–$C_6$ alkyl methacrylate, acrylic acid, methacrylic acid and a mixture of one or more of these monomers optionally with a crosslinking agent.

More particularly, the first phase or the core of the graft copolymer comprises polymerized conjugated diene units or a copolymer of polymerized diene units with polymerized units of a, preferably aromatic, vinyl compound. Suitable conjugated dienes are butadiene, isoprene, 1-3-pentadiene, and the like. Examples of suitable vinyl compounds are styrene-alphamethyl styrene, vinyl toluene, paramethyl styrene, and esters of (meth-)acrylic acid. The core of such a copolymer should contain at least 50% diene units. The core of the graft copolymer is preferably built up from a styrene-butadiene copolymer with approximately 10–50% by weight styrene and approximately 90–50% by weight butadiene, with a molecular weight between 25,000 and 1,500,000, preferably between 150,000 and 500,000. The core may also comprise a cross-linking agent as will be described in greater detail hereinafter.

The graft copolymer preferably comprises a second intermediate phase of a polymerized vinyl monomer which is grafted on the first phase or core. The presence of such a second phase, however, is not strictly necessary. Suitable vinyl monomers for the second intermediate phase are, for example, vinyl toluene, alphamethyl styrene, halogenated styrene, naphtalene and nonaromatic compounds, such as acrylonitrile, methacrylonitrile, alpha-halogenated acrylonitrile. It is possible to use one or more of these vinyl monomers. Styrene is preferably used.

The third enveloping (shell) phase of the graft copolymer comprises polymerized units of a monomer selected from the group consisting of a $C_1$–$C_6$ alkyl acrylate, a $C_1$–$C_6$ alkyl methacrylate, acrylic acid, methacrylic acid, and a mixture of one or more of these compounds optionally with a cross-linking monomer. More particularly, the monomeric compound may comprise a $C_1$–$C_6$ alkyl acrylate, for example, methacrylate, ethylacrylate, hexyl acrylate and the like; a $C_1$–$C_6$ alkyl methacrylate, for example methyl methacrylate, ethyl methacrylate, hexyl methacrylate, and the like; acrylic acid or methacrylic acid. Methyl methacrylate is preferably used.

In addition to the monomeric compound, the third or shell phase of the graft copolymer may comprise a cross-linking monomer in a quantity of approximately 0.1 to approximately 2.5 parts by weight based on the weight of the graft copolymer. The cross-linking monomer is a polyethylenically unsaturated monomer having several groups which are reactive for addition polymerization and all of which polymerize with approximately the same reaction velocity. Suitable cross-linking monomers are polyacrylic acid and polymethacrylic acid esters of polyols, for example, butylene diacrylate and dimethacrylate, trimethylol propane trimethacrylate, and the like, divinyl and trivinyl benzene, vinyl acrylate and methacrylate, and the like. Butylene diacrylate is the preferably used cross-linking monomer.

The graft copolymer (b) usually consists of approximately 60-80 parts by weight of the first phase or core, of approximately 10-20 parts by weight of the second, intermediate phase, and of approximately 10-20 parts by weight of the third, shell phase. Good results have been obtained in particular with a graft copolymer having a core built up from 71 parts of butadiene, 3 parts of styrene, 4 parts of methyl methacrylate, and 1 part of divinyl benzene; a second phase from 11 parts by weight of styrene and a shell phase from 11 parts by weight of methyl methacrylate and 0.1 part by weight of methyl methacrylate and 0.1 part by weight of 1,3-butylene glycol dimethacrylate. Such a graft copolymer is commercially available as ACRYLOID KM 653 from Rohm and Haas Chemical Company.

The above-mentioned graft copolymers and methods of preparing same are described in U.S. Pat. No. 4,180,494.

In addition to the above-mentioned constituents, the polymer mixtures according to the invention may comprise usual additives such as pigments, for example, titanium dioxide, flame-retarding additives, reinforcing agents, such as glass fibres, fillers, stabilizers, and the like.

The method of preparing the polymer mixtures according to the invention is not critical. Any known mixing method in itself is suitable. According to a preferably used method the constituents and the additives are mixed in a dry form, after which the resulting mixture is extruded and chopped to form grains.

The invention will now be described in greater detail with reference to the following examples.

EXAMPLES I (Reference)

100 parts of polycarbonate, the homopolymer derived from 2,2-bis (4-hydroxyphenyl) propane and phosgene with a weight-averaged molecular weight of 28,000 were premixed in a Papenmeyer high-speed mixer for 3 minutes with 0.1 part of an organic phosphite, 0.3 parts of an aliphatic fatty acid ester, 0.25 parts of titanium dioxide and 0.5 parts of a red organic dye. The resulting pre-mixture was melted and granulated on a 30 mm single-blade Leistriz extruder at 280° C. On an injection moulding machine standardized at 300° C., test pieces were manufactured from the granulate to determine the following properties:

(a) Stress fracture sensitivity

ASTM tensile test bars are placed in a metal holder which imposes 0.3% bending deformation on the samples. The holder with bars is placed in a 50/50 mixture of toluene/iso-octane ("fuel C") at 25° C. The time until the occurrence of the first crack, as well as the time till fracture are measured.

(b) Tensile strength at −20° C. after fuel C immersion

ASTM tensile bars are contacted—stress-free and with an imposed bending deformation of 0.7%—with "fuel C" for 30 seconds. The bars are dried at room temperature for 24 hours and are then tested at −20° C. at a rate of 100 cm per minute. The tensile strength upon flowing or fracture of the material is recorded.

(c) Falling dart impact at −20° C.

Falling dart disks having a diameter of 10 cm and a thickness of 3 mm are provided, in the centre of the disk, with a 2 cm long notch, 0.5 mm deep, 0.4 mm wide, by using a knife. The disks are then contacted with fuel C for 30 seconds and dried at room temperature for 24 hours. The disks are then tested at −20° C. using an instrumented "falling-dart" apparatus. The energy absorbed by the material is recorded.

(d) Delamination

The injection-moulded test pieces are evaluated at the sprue for the presence of a laminated structure and quality of the surface, notably discoloring (light spots). In this manner an impression is obtained qualitatively of the tendency of the material to delamination in given injection moulding conditions.

The obtained results of Example I are recorded in Table A in which the results for Examples II through VI are also recorded.

EXAMPLE II (Reference)

The same mixture as described in Example I was prepared with the proviso that 4 parts of MBS-shell core rubber (KM 653 of Messrs. Rohm & Haas) are added to 96 parts of polycarbonate. MBS-shell core rubber consists of a polybutadiene core on which styrene and methacrylate has been grafted.

EXAMPLE III (Reference)

The same mixture as described in Example I was prepared with the proviso that 2 parts of hydrogenated SBS-block copolymer (Kraton G 1650 of Shell) were added to 98 parts of polycarbonate (a styrene-butadienestyrene block copolymer).

EXAMPLE IV (Reference)

The same mixture as described in Example I was prepared with the proviso that 6 parts of hydrogenated SBS-blockcopolymer (Kraton G 1650) were added to 94 parts of polycarbonate.

EXAMPLE V

The same mixture as described in Example I was prepared with the proviso that 4 parts of MBS-shell-core rubber (KM 653) and 2 parts of hydrogenated SBS-block copolymer (Kraton G 1650) were added to 94 parts of polycarbonate.

EXAMPLE VI

The same mixture as described in Example I was prepared with the proviso that 6 parts of MBS-shell-core rubber (KM 653) and 2 parts of hydrogenated SBS-block copolymer (Kraton G 1650) were added to 92 parts of polycarbonate.

TABLE A

| Example | I* | II* | III* | IV* | V | VI |
|---|---|---|---|---|---|---|
| Composition (parts by weight) | | | | | | |
| Polycarbonate | 100 | 96 | 98 | 94 | 94 | 92 |
| MBS-shell-core rubber (KM 653) | — | 4 | — | — | 4 | 6 |
| Hydrogenated SBS-block copolymer (Kraton G 1650) | — | — | 2 | 6 | 2 | 2 |
| Properties | | | | | | |
| Stress fracture sensitivity Medium: fuel C, 25° C. | | | | | | |
| 0.3% deformation | | | | | | |
| time till 1st crack (s) | 160 | 323 | 1200 | 1200 | 1200 | 1200 |
| time till fracture (s) | 245 | 480 | 1200 | 1200 | 1200 | 1200 |
| Tensile strength at −20° C. (N/mm$^2$) after 30 sec. fuel C dip at: 0% deformation | 78 | 73.5 | 76.5 | 71.8 | 71.9 | 68.6 |
| 0.7% deformation | 18.5 | 33.3 | 70.0 | 69.0 | 66.8 | 63.1 |
| decrease (N/mm$^2$) | 59.5 | 40.2 | 6.5 | 2.8 | 5.1 | 5.5 |
| % decrease | 77 | 54 | 8.5 | 4 | 7 | 8 |
| Falling Dart Impact (J) at −20° C. after 30 sec. fuel dip with scratch | 2 | 6 | 5 | 3 | 30 | 61 |
| Tendency to delamination | none | none | hardly any | pronounced | hardly any | hardly any |

*reference

It appears from Table A that only the compositions which comprise both an MBS-shell core rubber and a hydrogenated SBS-block copolymer are characterized by increased resistance to organic solvents coupled with a better impact strength at low temperature. The good impact strength at low temperature of the sample according to the invention, i.e. examples V and VI, is surprisingly much better than could be expected on the basis of the impact strength of the samples wich comprise only MBS-shell core rubber (Example II) or only a hydrogenated SBS-block copolymer (Examples III and IV).

I claim:

1. A polymer mixture which comprises an aromatic polycarbonate resin and an impact strength-improving agent, characterized in that the polymer mixture comprises the following constituents:
   (a) 86–99% by weight of an aromatic polycarbonate resin;
   (b) 0.5–4% by weight of one or more partially hydrogenated block copolymers consisting of at least two terminal polymer blocks A of a monoalkenyl-arylene having an average molecular weight of 5,000–125,000 and at least one intermediate polymer block B of a conjugated diene having an average molecular weight of 10,000–300,000, the terminal polymer blocks A forming 8–55% by weight of the block copolymer, while not more than 25% by weight of the aromatic double bonds of the polymer blocks A and at least 80% of the aliphatic double bonds of the polymer blocks B have been reduced by hydrogenation, and
   (c) 0.5–10% by weight of one or more graft copolymers having an elastomeric core built up for more than 50% by weight from a polymerized diene, optionally a second phase built up from a polymerized vinyl monomer grafted on the core and having an enveloping phase (shell) built up from the polymerized product of one or more monomers selected from the group consisting of a $C_1$–$C_6$ alkyl acrylate, a $C_1$–$C_6$ alkyl methacrylate, acrylic acid, methacrylic acid and a mixture of one or more of the said monomers optionally with a cross-linking agent, which enveloping phase is grafted on the core and on the second phase optionally present, the quantities of a, b and c being calculated with respect to the overall quantity of a+b+c.

2. A polymer mixture as claimed in claim 1, characterized in that the polymer mixture comprises the following constituents:
   (a) 90–99% by weight of aromatic polycarbonate resin;
   (b) 0.5–3.5% by weight of the block copolymer, and
   (c) 0.5–6.5% by weight of the graft copolymer.

3. A polymer mixture as claimed in claim 1, characterized in that the graft copolymer comprises a core built up from a butadiene-styrene copolymer, a second phase of polystyrene and a third enveloping phase of methyl methacrylate and 1,3-butylene glycol dimethacrylate.

4. A polymer mixture as claimed in claim 3, characterized in that the polymer mixture comprises a graft copolymer C built up from a core polymerized from 71 parts by weight of butadiene, 3 parts by weight of styrene, 4 parts by weight of methyl methacrylate and 1 part by weight of divinyl benzene; a second phase polymerized from 11 parts by weight of styrene and a third enveloping phase (shell) polymerized from 11 parts by weight of methyl methacrylate and 0.1 part by weight of 1,3-butylene glycol dimethacrylate, the parts by weight being calculated with respect to the overall weight of the graft copolymer.

* * * * *